US011458671B2

(12) United States Patent
Achten et al.

(10) Patent No.: US 11,458,671 B2
(45) Date of Patent: Oct. 4, 2022

(54) ADDITIVE MANUFACTURING PROCESS USING SEVERAL THERMOPLASTIC POLYURETHANES

(71) Applicant: COVESTRO DEUTSCHLAND AG, Leverkusen (DE)

(72) Inventors: Dirk Achten, Leverkusen (DE); Thomas Büsgen, Leverkusen (DE); Michael Kessler, Cologne (DE); Peter Reichert, Dormagen (DE); Roland Wagner, Leverkusen (DE); Nicolas Degiorgio, Krefeld (DE); Jonas Kuenzel, Leverkusen (DE); Ting Liu, Cologne (DE)

(73) Assignee: Covestro Deutschland AG, Leverkusen (DE)

( * ) Notice: Subject to any disclaimer, the term of this patent is extended or adjusted under 35 U.S.C. 154(b) by 337 days.

(21) Appl. No.: 16/605,988

(22) PCT Filed: Apr. 23, 2018

(86) PCT No.: PCT/EP2018/060303
§ 371 (c)(1),
(2) Date: Oct. 17, 2019

(87) PCT Pub. No.: WO2018/197396
PCT Pub. Date: Nov. 1, 2018

(65) Prior Publication Data
US 2021/0138720 A1 May 13, 2021

(30) Foreign Application Priority Data
Apr. 24, 2017 (EP) .................. 17167679.4

(51) Int. Cl.
| | | |
|---|---|---|
| *B29C 64/118* | (2017.01) | |
| *B33Y 10/00* | (2015.01) | |
| *B33Y 70/00* | (2020.01) | |
| *B33Y 80/00* | (2015.01) | |
| *B29K 75/00* | (2006.01) | |

(52) U.S. Cl.
CPC ............ *B29C 64/118* (2017.08); *B33Y 10/00* (2014.12); *B33Y 70/00* (2014.12); *B33Y 80/00* (2014.12); *B29K 2075/00* (2013.01)

(58) Field of Classification Search
CPC ......... C08L 75/04; C08L 75/06; C08G 18/10; C08G 18/3206; C08G 18/42; C08G 18/73; C08G 18/7671; B29C 64/118; B29K 2075/00; B33Y 70/00; B33Y 80/00; B33Y 10/00
See application file for complete search history.

(56) References Cited

U.S. PATENT DOCUMENTS

| | | | |
|---|---|---|---|
| 10,864,708 B2 * | 12/2020 | Pudleiner ........... | A61C 13/0022 |
| 10,934,386 B2 * | 3/2021 | Grablowitz ........ | C08G 18/3814 |
| 2015/0093465 A1 | 4/2015 | Page | |
| 2015/0125682 A1 | 5/2015 | Greger | |
| 2016/0096324 A1 | 4/2016 | Giller | |
| 2016/0333152 A1 | 11/2016 | Cook et al. | |
| 2017/0008233 A1 | 1/2017 | Vontorcik, Jr. et al. | |

FOREIGN PATENT DOCUMENTS

| | | |
|---|---|---|
| CN | 103756236 A | 4/2014 |
| EP | 3028842 A1 | 6/2016 |
| WO | 2015073301 A1 | 5/2015 |
| WO | 2016108154 A1 | 7/2016 |
| WO | 2017015072 A1 | 1/2017 |

OTHER PUBLICATIONS

Shore Durometers of Common Materials, Wikipedia, https://en.wikipedia.org/wiki/Shore_durometer, accessed Oct. 23, 2021. (Year: 2006).*
Hardness Scales, 2007, https://web.archive.org/web/20070707141201/http://www.calce.umd.edu/general/Facilities/Hardness_ad_.htm#3.5 (Year: 2007).*
Raasch et al., "Characterization of polyurethane shape memory polymer processed by material extrusion additive manufacturing," Additive Manufacturing, vol. 8, Oct. 2015, pp. 132-141.
International Search Report, PCT/EP2018/060303, dated Jun. 7, 2018, Authorized officer: Nathalie Pierre.
Miner Elastomer Products Corporation, TecsPak Technical Data Sheet, Shore A to Shore D Comparison, Aug. 2010, retrieved from the internet: https://www.minerelastomer.com/technical-data/tecspak-features/shore-shore-d-comparison/.

* cited by examiner

*Primary Examiner* — Philip C Tucker
*Assistant Examiner* — Evan T Hulting
(74) *Attorney, Agent, or Firm* — Jed C. Benson

(57) ABSTRACT

The invention relates to a method for producing an object, comprising the step of producing the object from a construction material by means of an additive manufacturing process, wherein the construction material comprises a plurality of thermoplastic polyurethane materials. The materials differ by at least one mechanical property such as the shore hardness or the elongation at break. The invention also relates to an object obtained according to said method.

13 Claims, No Drawings

ADDITIVE MANUFACTURING PROCESS USING SEVERAL THERMOPLASTIC POLYURETHANES

CROSS-REFERENCE TO RELATED APPLICATION

This application is a national stage application under 35 U.S.C. § 371 of PCT/EP2018/060303, filed Apr. 23, 2018, which claims the benefit of European Application No. 17167679, filed Apr. 24, 2017, each of which is incorporated herein by reference.

FIELD

The present invention relates to a process for producing an article, comprising the steps of:
I) providing a construction material heated at least partly to a temperature above its glass transition temperature on a carrier, such that a layer of the construction material is obtained, corresponding to a first selected cross section of the article;
II) providing a construction material heated at least partly to a temperature above its glass transition temperature onto a previously provided layer of the construction material, such that a further layer of the construction material is obtained, corresponding to a further selected cross section of the article and bonded to the previously provided layer; and
III) repeating step II) until the article is formed.

BACKGROUND

One aspect in which the use of multiple materials in an additive manufacturing method, also referred to as multimaterial 3D printing, is known in the prior art is in connection with support structures that are to be removed later. For instance, the article to be produced itself may have been constructed from a water-insoluble material and the support structures from a water-soluble material. The actual article is then obtained by leaching out the support structures.

In multimaterial 3D printing, it is firstly possible to mix different materials to give a construction material. For instance, the mixing of differently colored construction material is the subject of patent application WO 2015/073301 A1. What is disclosed is a continuous three-dimensional printer (3D printer) comprising one or more cartridges having a construction material present therein and a mixer connected to each cartridge, a single printhead connected to an outlet from the mixing head. The construction material present in the cartridge is transported to the mixing head and the single printhead in order to obtain a continuously colored object.

US 2015/0093465 A1, by contrast, describes an additive manufacturing system and such a device containing a material application system with an extruder for application of materials, wherein the extruder has two or more material inlets and a mixing chamber and an outlet. In addition, there is a control unit coupled to the extruder, which can dynamically alter the feed rates of the materials to be mixed in the mixing chamber before the materials emerge from the extruder outlet. The control unit combines a target value for the volume flow rate of the material from the extruder outlet with a mixing ratio in order to determine the feed rates of the materials. The system may contain a filament drive in order to supply the thermoplastic materials in filament form to the material inlets. During the operation of the filament drive, the control unit can dynamically alter the mixing ratio in order to determine one or more properties of the material emerging from the extruder outlet.

Another variant of multimaterial 3D printing is the use of multiple construction materials alongside one another or one on top of another.

WO 2016/108154 A1 discloses a process for producing individualized immobilization elements for non-invasive immobilization and/or mobilization of at least one segment of a part of a patient's body at a predetermined position relative to a reference and/or a predetermined configuration. The process comprises the steps of (i) providing a data set that comprises a three-dimensional image of an outer contour of at least a portion of the segment of the body part to be immobilized and/or mobilized; (ii) manufacturing of at least a part of the immobilization element by rapid manufacturing of a shape based on said data set, using a polymeric material containing a thermoplastic polymer having a melting point less than or equal to 100° C., wherein the polymer material contains a nucleating agent capable of enhancing crystallization of the thermoplastic polymer.

SUMMARY

When different thermoplastic materials are to be used in a multimaterial 3D printing method, the processing parameters during the printing operation should encompass a range that relates to all the material used. For example, the processing temperature should be chosen such that all material melts. In the case of polyamides, however, the melting points of the material are in some cases far apart: PA 6.6 (260° C.), PA 6.10 (240° C.), PA 6 (220° C.), PA 6.12 (218° C.), PA 11 (198° C.) and PA 12 (178° C.). Thus, certain limits are set on fine adjustment of the construction material by mixing of various polyamides.

It is an object of the present invention to at least partly overcome at least one disadvantage of the prior art. It is a further object of the present invention to specify an additive manufacturing method in which the mechanical and/or chemical properties in different regions of the article produced thereby can be varied with simultaneously maximum cohesive bonding of the individual regions within the article. It is a further object of the invention to provide an article of maximum intrinsic homogeneity with regions having different mechanical or chemical properties. It was a further object of the invention to be able to produce an article with maximum cost efficiency and/or individualization and/or resource conservation.

The object is achieved in accordance with the invention by a process and an article as recited in the claims. Advantageous developments are specified in the claims. They may be combined as desired, unless the opposite is unambiguously apparent from the context.

DETAILED DESCRIPTION

A process for producing an article in an additive manufacturing method with layers of different materials comprises the steps of:
I) providing a construction material heated at least partly to a temperature above its glass transition temperature on a carrier, such that a layer of the construction material is obtained, corresponding to a first selected cross section of the article;
II) providing a construction material heated at least partly to a temperature above its glass transition temperature onto a previously provided layer of the construction material, such that a further layer of the construction material is obtained, corresponding to a further selected cross section of the article and bonded to the previously provided layer;

III) repeating step II) until the article is formed;

where, in steps I) and II), the providing of a construction material heated at least partly to a temperature above its glass transition temperature is effected by applying a filament of a construction material heated at least partly to a temperature above its glass transition temperature.

In the individual steps II), the construction material in each case is selected from a first construction material containing a thermoplastic polyurethane polymer or a second construction material different therefrom that contains a thermoplastic polyurethane polymer, where step II) is conducted at least once with the first construction material and step II) is conducted at least once with the second construction material.

According to the invention, the article is produced by means of an additive manufacturing method ("3D printing") from a construction material. The additive manufacturing method is selected here from the group of the melt layering methods (fused filament fabrication, FFF, or fused deposition modeling, FDM).

The term "melt layering method" refers to a manufacturing method from the field of additive manufacturing, with which a workpiece is formed layer by layer, for example from a fusible plastic. The plastic may be used with or without further additions such as fibers. Machines for FDM/FFF form part of the machine class of 3D printers. This method is based on the liquefaction of a plastic or wax material in wire form by heating. The material solidifies in the course of final cooling. Material application is effected by extrusion with a heating nozzle which is freely movable in relation to a manufacturing plane. It is possible here either for the manufacturing plane to be fixed and for the nozzle to be freely movable or for a nozzle to be fixed and a substrate table (with a manufacturing plane) to be moved, or for both elements, the nozzle and manufacturing plane, to be movable. The speed with which the substrate and nozzle are movable with respect to one another is preferably within a range from 1 to 200 mm/s. According to the application, the layer thickness is within a range from 0.025 and 1.25 mm.

In layer-by-layer model production, the individual layers are thus bonded to form a complex part. A body is typically constructed by repeatedly tracing a working plane line by line (forming a layer) and then moving the working plane upward in a "stacking" manner (forming at least one further layer atop the first layer), so as to form a shape layer by layer. The exit temperature of the mixtures of matter from the nozzle may, for example, be 80° C. to 420° C., and even briefly higher up to about 450° C. It is additionally possible to heat the substrate table, for example to 20° C. to 250° C. This can prevent excessively fast cooling of the applied layer so that a further layer applied thereupon is sufficiently joined to the first layer.

If the number of repetitions for the applying is sufficiently low, it is also possible to make reference to a two-dimensional article which is to be constructed. Such a two-dimensional article can also be characterized as a coating. For example, for construction thereof, $\geq 2$ to $\leq 20$ repetitions for the application can be conducted.

The individual filaments which are applied may have a diameter of $\geq 30$ μm to $\leq 2000$ μm, preferably $\geq 40$ μm to $\leq 1000$ μm and more preferably $\geq 50$ μm to $\leq 500$ μm.

The different property of the first and second construction material may be selected, for example, from the group consisting of: Shore hardness (DIN ISO 7619-1), breaking strength (DIN 53504, 200 mm/min), elongation at break (DIN 53504, 200 mm/min), tensile stress at 100% elongation (DIN 53504, 200 mm/min), tensile stress at 300% elongation (DIN 53504, 200 mm/min), resilience (ISO 4662) or a combination of at least two of these.

Thermoplastic polyurethanes (TPUs) have the advantage that materials in a comparatively small window of processing conditions, especially of processing temperature, with a wide range of mechanical and/or chemical properties are available. Thus, it is possible to process different thermoplastic polyurethanes having a Shore hardness (DIN ISO 7619-1) of $\geq 40$ A to $\leq 85$ D in a temperature range from $\geq 190°$ C. to $\leq 250°$ C. together, where the resultant article has a macroscopic Shore hardness which may be between the greatest and smallest hardness of the polyurethanes used. This enables fine adjustment of the mechanical properties, which can of course also vary spatially within the article to be produced itself. As a result of the chemical compatibility of the polyurethanes with one another, in the process of the invention, a contact zone may arise between layers of different construction materials in the form of a polymer blend.

A polymer blend thus obtained can be distinguished from conventional polymer blends in that boundary regions arise that differ from the materials originally used not just physically as a mixture but also in chemical terms. In polyurethanes as representatives of the addition polymers, at the processing temperatures used, reversible openings the urethane groups can open reversibly and transurethanizations can occur. If, for example, two alongside layers are melted and one layer is constructed from a first polyurethane based on a first isocyanate and a first polyol and the other layer is constructed from a second polyurethane based on a second isocyanate and a second polyol, there may also be polyurethanes on the basis of the first isocyanate and the second polyol and on the basis of the second isocyanate and the first polyol in the contact zone as a result of transurethanizations.

Polyisocyanates suitable for the preparation of the various TPUs may be symmetric polyisocyanates, asymmetric polyisocyanates or mixtures thereof. Examples of symmetric polyisocyanates are 4,4'-MDI and HDI.

In the case of asymmetric polyisocyanates, the steric environment of one NCO group in the molecule is different from the steric environment of a further NCO group. In that case, one isocyanate group reacts more quickly with groups reactive toward isocyanates, for example OH groups, while the remaining isocyanate group is less reactive. One consequence of the asymmetric structure of the polyisocyanate is that the polyurethanes formed with these polyisocyanates also have a less linear structure.

Examples of suitable asymmetric polyisocyanates are 2,2,4-trimethylhexamethylene diisocyanate, ethylethylene diisocyanate, asymmetric isomers of dicyclohexylmethane diisocyanate ($H_{12}$-MDI), asymmetric isomers of 1,4-diisocyanatocyclohexane, asymmetric isomers of 1,3-diisocyanatocyclohexane, asymmetric isomers of 1,2-diisocyanatocyclohexane, asymmetric isomers of 1,3-diisocyanatocyclopentane, asymmetric isomers of 1,2-diisocyanatocyclopentane, asymmetric isomers of 1,2-diisocyanatocyclobutane, 1-isocyanatomethyl-3-isocyanato-1,5,5-trimethylcyclohexane (isophorone diisocyanate, IPDI), 1-methyl-2,4-diisocyanatocyclohexane, 1,6-diisocyanato-2,2,4-trimethylhexane, 1,6-diisocyanato-2,4,4-trimethylhexane, 5-isocyanato-1-(3-isocyanatoprop-1-yl)-1,3,3-trimethylcyclohexane, 5-isocyanato-1-(4-isocyanatobut-1-yl)-1,3,3-trimethylcyclohexane, 1-isocyanato-2-(3- isocyanatoprop-1-yl)cyclohexane, 1-isocyanato-2-(2-isocyanatoeth-1-yl)cyclohexane, 2-heptyl-3,4-bis(9-isocyanatononyl)-1-pentylcyclohexane, norbornane diisocyanatomethyl, diphenylmethane 2,4'-diisocyanate (MDI), tolylene 2,4- and 2,6-diisocyanate (TDI), and derivatives of the diisocyanates listed, especially dimerized or trimerized types.

Preference is given to 4,4'-MDI, HDI or a mixture comprising IPDI and HDI as polyisocyanate component.

The polyol component may contain a polyol selected from the group of: polyether polyols, polyester polyols, polyetherester polyols, polycarbonate polyols or a combination of at least two of these.

In the reaction to give the polyurethanes, it is optionally also possible to use diols in the molecular weight range from ≥62 to ≤600 g/mol as chain extenders.

As well as the thermoplastic polyurethane polymers, the construction materials used may each contain further additives such as fillers, stabilizers and the like. The total content of additives in the individual construction material may, for example, be ≥0.1% by weight to ≤50% by weight, preferably ≥1% by weight to ≤30% by weight.

The process of the invention can be conducted within a construction space and the temperature of the construction space is preferably ≤140° C., more preferably ≤130° C. and especially preferably ≤120° C.

As well as the construction space temperature, a factor may be the temperature of the construction base in the process of the invention on which the first layer is printed. The temperature of the construction base in this connection is preferably greater than the glass transition temperature of at least one of the construction materials.

According to the invention, moreover, step II) is conducted at least once with the first construction material and step II) is conducted at least once with the second construction material. In this way, a composite of different layers can be constructed. How often step II) is conducted with the first construction material and how often step II) is conducted with the second construction material is fundamentally not fixed. It is likewise left open to the user of the process to determine the individual sequence of layers with the first construction material and with the second construction material. This may be guided by the function of the article to be produced.

In the process of the invention, it is of course possible to use more than two different construction materials. Thus, in each of the individual steps II), the construction material may be selected from a first construction material, a second construction material and a third construction material that are each different from one another. In that case, step II) is conducted at least once with the first construction material, once with the second construction material and once with the third construction material. Analogously, in each of the individual steps II), the construction material may be selected from a first construction material, a second construction material, a third construction material and a fourth construction material that are each different from one another. In that case, step II) is conducted at least once with the first construction material, once with the second construction material, once with the third construction material and once with the fourth construction material. It is also true of these more than two different construction materials that they differ in a feature such as melting point, crystallinity or some other measurable property.

It is also possible in the process of the invention that one layer of the body to be produced is constructed from more than one construction material. In that case, for example, first and second construction materials are present alongside one another.

In a preferred embodiment, the first and second construction material differ from one another by their Shore hardness (DIN ISO 7619-1).

In a further preferred embodiment, the difference in Shore hardnesses (DIN ISO 7619-1) between the first and second construction material is ≥5 A to ≤55 A and/or ≥5 D to ≤40 D.

More particularly, the first construction material may comprise a thermoplastic polyurethane material having a Shore hardness (DIN ISO 7619-1) of ≥40 A to ≤85 D and the second construction material may comprise a thermoplastic polyurethane material a Shore hardness (DIN ISO 7619-1) of ≥40 A to ≤85 D, where the difference in Shore hardnesses between the first and second construction material is ≥5 A to ≤55 A and/or ≥5 D to ≤40 D.

One example is a first construction material having a Shore hardness (DIN ISO 7619-1) of ≥40 A to ≤80 A and a second construction material having a Shore hardness (DIN ISO 7619-1) of ≥70 A to ≤95 A. The difference in Shore hardnesses between the first and second construction material is ≥5 A to ≤55 A.

A further example is a first construction material having a Shore hardness (DIN ISO 7619-1) of ≥65 A to ≤75 A and a second construction material having a Shore hardness (DIN ISO 7619-1) of ≥80 A to ≤95 A. The difference in Shore hardnesses between the first and second construction material is ≥10 A to ≤30 A.

In a further preferred embodiment, the first and second construction material differ from one another by their elongation at break (DIN 53504, 200 mm/min).

The difference in elongations at break (DIN 53504, 200 mm/min) between the first and second construction material is preferably ≥50 percentage points to ≤700 percentage points.

More particularly, the first construction material may have an elongation at break (DIN 53504, 200 mm/min) of ≥100% to ≤800% and the second construction material may have an elongation at break (DIN 53504, 200 mm/min) of ≤100% to ≥800%, where the difference in elongations at break between the first and second construction material is ≥50 percentage points to ≤200 percentage points.

One example is a first construction material having an elongation at break (DIN 53504, 200 mm/min) of ≥400% to ≤600% and a second construction material having an elongation at break (DIN 53504, 200 mm/min) of ≥200% to ≤400%. The difference in elongations at break between the first and second construction material is ≥50 percentage points to ≤200 percentage points.

A further example is a first construction material having an elongation at break (DIN 53504, 200 mm/min) of ≥450% to ≤550% and a second construction material having an elongation at break (DIN 53504, 200 mm/min) of ≥250% to ≤350%. The difference in elongations at break between the first and second construction material is ≥100 percentage points to ≤200 percentage points.

In a further preferred embodiment, the first or second construction material, with regard to its fusible components, has a melting range (DSC, differential scanning calorimetry; 2nd heating at heating rate 20 K/min.) of ≥30° C. to ≤240° C. The melting range is preferably within a temperature range from ≥40° C. to ≤130° C. and more preferably from ≥45° C. to ≤120° C. In the DSC analysis for determination of the melting range, the material is subjected to the following temperature cycle: 1 minute at =60° C., then heating to 200° C. at 20 kelvin/minute, then cooling to −60° C. at 20 kelvin/minute, then 1 minute at −60° C., then heating to 200° C. at 20 kelvin/minute.

It is possible that the temperature interval between the start of the melting operation and the end of the melting operation as determinable by the above DSC protocol is ≤20° C., preferably ≤10° C. and more preferably ≤5° C.

In a further preferred embodiment, the production of the article by means of the additive manufacturing method comprises the steps of:
applying a filament of an at least partly molten construction material to a carrier, such that a layer of the construction material is obtained, corresponding to a first selected cross section of the article;
applying a filament of the at least partially molten construction material onto a previously applied layer of the construction material to obtain a further layer of the construction material which corresponds to a further selected cross section of the article and which is joined to the previously applied layer;
repeating the step of applying a filament of the at least partially molten construction material onto a previously applied layer of the construction material until the article has been formed.

The first step of this embodiment of the process relates to the construction of the first layer on a carrier. Subsequently, the second step, in which further layers are applied to previously applied layers of the construction material, is executed until the desired end result in the form of the article is obtained. The at least partly molten construction material bonds to existing layers of the material in order to form a structure in z direction.

In a further preferred embodiment, at least one of the construction materials used is a thermoplastic polyurethane elastomer (TPE). For example, the first and second construction material may be a TPE.

In a further preferred embodiment, at least one of the construction materials used comprises a thermoplastic polyurethane elastomer obtainable from the reaction of a polyisocyanate component and a polyol component, said polyol component comprising a polyester polyol having a no-flow point (ASTM D5985) of ≥25° C. to ≤100° C. More particularly, the polyol component can include a polyester polyol having a no-flow point (ASTM D5985) of ≥25° C. to ≤90° C., preferably ≥35° C. to ≤80° C., more preferably ≥35° C. to ≤55° C. To determine the no-flow point, a test vessel containing the sample is set in slow rotation (0.1 rpm). A flexibly mounted measurement head dips into the sample and, on attainment of the no-flow point, moves away from its position as a result of the abrupt increase in viscosity; the resulting tilting motion triggers a sensor.

Examples of polyester polyols which can have such a no-flow point are reaction products of phthalic acid, phthalic anhydride or symmetric $\alpha,\omega$-$C_4$- to $C_{10}$-dicarboxylic acids with one or more $C_2$- to $C_{10}$-diols. They preferably have a number-average molecular weight $M_n$ of ≥400 g/mol to ≤6000 g/mol. Suitable diols are especially monoethylene glycol, butane-1,4-diol, hexane-1,6-diol and neopentyl glycol.

Preferred polyester polyols are specified hereinafter, stating their acid and diol components: adipic acid+monoethylene glycol; adipic acid+monoethylene glycol+butane-1,4-diol; adipic acid+butane-1,4-diol; adipic acid+hexane-1,6-diol+neopentyl glycol; adipic acid+hexane-1,6-diol; adipic acid+butane-1,4-diol+hexane-1,6-diol; phthalic acid/anhydride+monoethylene glycol+trimethylolpropane; phthalic acid/anhydride+monoethylene glycol. Preferred polyurethanes are obtained from a mixture containing IPDI and HDI or 4,4'-MDI as the polyisocyanate component and a polyol component containing an abovementioned preferred polyester polyol. Particular preference is given to the combination of a mixture comprising IPDI and HDI as polyisocyanate component with a polyester polyol formed from adipic acid+butane-1,4-diol+hexane-1,6-diol for formation of the polyurethanes.

It is further preferable that these polyester polyols have an OH number (DIN 53240) of ≥25 to ≤170 mg KOH/g and/or a viscosity (75° C., DIN 51550) of ≥50 to ≤5000 mPas.

One example is a polyurethane obtainable from the reaction of a polyisocyanate component and a polyol component, where the polyisocyanate component comprises an HDI and IPDI and where the polyol component comprises a polyester polyol which is obtainable from the reaction of a reaction mixture comprising adipic acid and also hexane-1,6-diol and butane-1,4-diol with a molar ratio of these diols of ≥1:4 to ≤4:1 and which has a number-average molecular weight $M_n$ (GPC, against polystyrene standards) of ≥4000 g/mol to ≤6000 g/mol. Such a polyurethane may have a magnitude of the complex viscosity $|\eta^*|$ (determined by viscometry measurement in the melt with a plate/plate oscillation viscometer according to ISO 6721-10 at 100° C. and a shear rate of 1/s) of ≥4000 Pas to ≤160 000 Pas.

A further example of a suitable polyurethane is:
1. Substantially linear polyester polyurethanes having terminal hydroxyl groups as described in EP 0192946 A1, prepared by reaction of
a) polyester diols of molecular weight above 600 and optionally
b) diols from the molecular weight range from 62 to 600 g/mol as chain extenders with
c) aliphatic diisocyanates,
observing an equivalents ratio of hydroxyl groups of components a) and b) to isocyanate groups of component c) of 1:0.9 to 1:0.999, where component a) consists to an extent of at least 80% by weight of polyester diols from the molecular weight range of 4000 to 6000 based on (i) adipic acid and (ii) mixtures of 1,4-dihydroxybutane and 1,6-dihydroxyhexane in a molar ratio of the diols of 4:1 to 1:4.

In the polyester polyurethanes mentioned under 1. it is preferable that component a) consists to an extent of 100% of a polyester diol of the molecular weight range from 4000 to 6000, the preparation of which involved using, as diol mixture, a mixture of 1,4-dihydroxybutane and 1,6-dihydroxyhexane in a molar ratio of 7:3 to 1:2.

In the polyester polyurethanes mentioned under 1, it is also preferable that component c) comprises IPDI and also HDI.

In the polyester polyurethanes mentioned under 1, it is further preferable that their production included use as component b) of alkanediols selected from the group consisting of 1,2-dihydroxyethane, 1,3-dihydroxypropane, 1,4-dihydroxybutane, 1,5-dihydroxypentane, 1,6-dihydroxyhexane and any desired mixtures of these diols in an amount of up to 200 hydroxyl equivalent percent based on component a).

It is further possible that after heating to 100° C. and cooling to 20° C. at a cooling rate of 4° C./min over a temperature interval from 25° C. to 40° C. for ≥1 minute (preferably ≥1 minute to ≤30 minutes, more preferably ≥10 minutes to ≤15 minutes) the thermoplastic elastomer has a storage modulus G' (determined at the respectively prevailing temperature with a plate/plate oscillation viscometer according to ISO 6721-10 at a shear rate of 1/s) of ≥100 kPa to ≤1 MPa and after cooling to 20° C. and storage for 20 minutes has a storage modulus G' (determined at 20° C. with a plate/plate oscillation viscometer according to ISO 6721-10 at a shear rate of 1/s) of ≥10 MPa.

In a further preferred embodiment, at least one of the construction materials used comprises a thermoplastic polyurethane polymer that has been obtained from the reaction of a diphenylmethane diisocyanate and/or the NCO-terminated reaction product thereof with a polyol-containing NCO component and a butane-1,4-diol-containing polyol component.

The NCO component for the preparation of the TPU material mentioned may thus contain MDI and/or an MDI-based prepolymer terminated with NCO groups. For the prepolymers, coreactants with MDI used for formation thereof may, for example, be polyether polyols and/or polyester polyols.

The polyol component for the preparation of this TPU material may contain exclusively butane-1,4-diol (BDO). This is the case especially when MDI-based prepolymers are to be subjected to a chain extension with BDO. A mixture of BDO with polymeric polyols such as polyether polyols and/or polyester polyols is used advantageously when this polyol component is reacted directly with MDI or HDI in a one-stage process.

Without being tied to a theory, it is assumed that the reaction of MDI or the termini of the corresponding prepolymers with BDO forms the hard segments of the polyurethanes that determine the melting point or melting range of the TPU. The soft segments of the TPU in that case derive from polymeric polyols. Thermoplastic polyurethane materials having hard segments based on MDI/BDO may have, for example, a melting point or melting range (DSC measurement) in the range from ≥170° C. to ≤240° C.

In a further preferred embodiment, at least one of the construction materials used comprises a thermoplastic polyurethane polymer that has been obtained from the reaction of a hexamethylene 1,6-diisocyanate-containing NCO component and/or the NCO-terminated reaction product thereof with a polyol and a butane-1,4-diol- and/or hexane-1,6-diol-containing polyol component.

The NCO component for the preparation of this TPU material may thus contain HDI and/or an HDI-based prepolymer terminated with NCO groups. For the prepolymers, coreactants with HDI used for formation thereof may, for example, be polyether polyols and/or polyester polyols.

The polyol component for the preparation of this TPU material may contain exclusively HDO. This is the case especially when an HDI-based prepolymer is to be subjected to a chain extension with HDO. A mixture of HDO with polymeric polyols such as polyether polyols and/or polyester polyols is used advantageously when this polyol component is reacted directly with HDI in a one-stage process.

Without being tied to a theory, it is assumed that, in the case of these materials, the melting point or melting range of the TPU is determined by the soft segments in the polymer, especially polyester polyol-based soft segments. Thermoplastic polyurethane materials having hard segments based on HDI/BDO may have, for example, a melting point or melting range (DSC measurement) in the range from ≥150° C. to ≤190° C.

In a further preferred embodiment, the process is conducted in a chamber and the temperature within the chamber is ≤50° C. The temperature is preferably ≥0° C. to ≤50° C., more preferably ≥5° C. to ≤40° C. and especially preferably ≥10° C. to ≤35° C.

At a comparatively low construction space temperature, it is possible to reduce or to suppress component warping as a result of spatially different crystallization processes. By working at a temperature below 100° C., it is possible to avoid formation of blisters in the component through water vapor. It is thus possible for the polymer to contain greater amounts of water than at higher temperatures in the chamber.

It is likewise possible to reduce the degree of sublimation of organic compounds into the chamber. In that case, it is also possible to process polymers comprising plasticizer and solvent. No specially dried or inert atmosphere in the chamber is required. Explosion protection in the chamber is likewise improved when operation is effected at a temperature below the flashpoint of the substances present in the chamber.

In a further preferred embodiment, at least one of the construction materials used is discharged through a nozzle having a temperature of ≤250° C.

Particular preference is given to the combination that the process is conducted in a chamber, that the temperature within the chamber is ≤50° C. and that at least one of the construction materials used is discharged through a nozzle having a temperature of ≤250° C.

As a result of the process of the invention, it is possible to obtain an article which is described hereinafter as a further aspect of the present invention.

It is a feature of the article obtainable by a process of the invention that the article comprises layers of a first construction material and a second construction material, where the first construction material contains a thermoplastic polyurethane polymer, the second construction material contains a thermoplastic polyurethane polymer different than the first construction material, and where the article has interlayer adhesion (180° peel test) in construction direction of the additive manufacturing method used in the production thereof that amounts to ≥60% (preferably ≥70%, more preferably ≥90%) of the interlayer adhesion of a homogeneous test specimen made of that construction material which has the lower interlayer adhesion.

In a preferred embodiment of the article, the first and second construction material are bonded to one another at least partly by covalent chemical bonds. This can be effected by transurethanizations between the first and second construction material. Such articles then have cohesive failure even in a 180° peel test, which indicates stronger interlayer adhesion overall.

In a further preferred embodiment, the article in relation to at least one mechanical property has a spatial change in said property that proceeds in steps smaller than the difference in this property between one end of the article and an opposite end of the article from this end. This property thus has a gradient across the article.

EXAMPLES

The present invention is elucidated further by the examples which follow, but without being restricted thereto. The abbreviations have the meanings which follow, and the Shore hardnesses were determined to DIN EN ISO 868.

TPU 1: thermoplastic polyurethane of the Desmopan DP 3690 AU type, Shore A 93, Shore D 40

TPU 2: thermoplastic polyurethane of the Desmopan 9385 A type, Shore A 86, Shore D 35

TPU 3: thermoplastic polyurethane of the Desmopan DP 3660 DU type, Shore A 98, Shore D 62

PLA: polylactide, Shore D 72

An FDM printer of the X400 CE type from RepRap with a volcano printhead was used with the following process conditions: filament diameter=2.85 mm, deposition speed=15 mm/s, printhead temperature=225° C., construction space temperature=23° C., extrusion die diameter=1.2 mm, layer thickness: 0.4 mm.

Test specimens of a first polymer that had width 30 mm, thickness 2 mm and length 300 mm were printed on this FDM printer. After the surface had been cooled down to room temperature for 15 minutes, an identical test specimen of a second polymer was pressed onto the test specimen thus produced, with the last 50 mm of the lower test specimen covered by a sheet of paper so as to form a non-contacted area of length 50 mm.

The bonded test specimens made of polymer 1 and polymer 2 were clamped in a tensile tester and tested for adhesion strength in a 180° peel test. The conditions were: sample width 30 mm, initial force 0 N, rate to initial force 20 mm/min, initial distance 50 mm, test distance 50 mm, test rate 100 mm/min, the maximum peel force (N/mm) and average peel force (N/mm) were measured.

The results are shown in the table below. "I" means an inventive example, "C" a comparative example.

| Polymer 1/Polymer 2 | Maximum peel force [N/mm] | Average peel force [N/mm] |
| --- | --- | --- |
| TPU 1/TPU 1 (C) | 13.4 | 12.7 |
| TPU 2/TPU 2 (C) | 9.1 | 8.4 |
| TPU 3/TPU 3 (C) | 13.3 | 12.5 |
| PLA/PLA (C)* | 7.2 | 6.6 |
| TPU 1/TPU 2 (I) | 9.1 | 8.1 |
| TPU 3/TPU 1 (I) | 9.7 | 9.3 |
| TPU 3/TPU 2 (I) | 10.5 | 9.5 |
| PLA/TPU 1 (C) | 2.4 | 2.1 |
| PLA/TPU 3 (C) | 0.1 | 0.1 |

*to test the PLA test specimen it had to be heated to 80° C. in order to align the test limbs to 180° for the testing machine prior to the peel test and enable testing in a 180° peel test.

It is clearly apparent that the inventive combinations of TPU materials with different hardnesses that are processed under comparable conditions at <250° C. as described above via 3D printing in conventional 3D-FDM printers achieve excellent interlayer adhesion not just in the case of like materials but surprisingly also in the case of significantly different TPU materials.

Visual inspection showed that the test specimens produced by the process of the invention did not have any smooth tear-off surfaces. Instead, elevations and complementary recesses that suggest cohesive failure and not just adhesive failure were observed.

It is particularly surprising that this good adhesion is even achieved on surfaces that have been cooled down. This allows a very robust and simple process regime for obtaining high-performance layer and gradient materials by means of 3D printing.

The invention claimed is:

1. A process for producing an article in an additive manufacturing method with layers of different materials, comprising:
   I) providing a first construction material heated at least partly to a temperature above its glass transition temperature to a carrier by applying a filament of the first construction material heated at least partly to a temperature above its glass transition temperature, such that a first layer of construction material is obtained, corresponding to a first selected cross section of the article;
   II) providing the first construction material or an additional construction material heated at least partly to a temperature above its glass transition temperature onto the first layer of construction material or another previously applied layer of construction material by applying a filament of the first construction material or the additional construction material heated at least partly to a temperature above its glass transition temperature, such that an additional layer of construction material is obtained, corresponding to an additional selected cross section of the article and bonded to the first layer or another previously applied layer;
   III) repeating step II) until the article is formed;
   wherein the first construction material comprises a first thermoplastic polyurethane polymer and the additional construction material comprises another thermoplastic polyurethane polymer different from the first thermoplastic polyurethane polymer, wherein the first construction material and the additional construction material differ from one another by their Shore hardness based on DIN ISO 7619-1 and wherein the difference in Shore hardness between the first construction material and the additional construction material is ≥5A to ≤55A, ≥5D to ≤40D, or both, and
   wherein step II) is conducted at least once with the additional construction material and wherein the additional construction material is not applied solely to an optional support structure configured to support the article.

2. The process as claimed in claim 1, wherein the first construction material and the additional construction material differ from one another by their elongation at break based on DIN 53504, 200 mm/min.

3. The process as claimed in claim 2, wherein the difference in elongation at break between the first construction material and the additional construction material is 50 percentage points to 700 percentage points.

4. The process as claimed in claim 1, wherein the filament of the first construction material is at least partially molten, the filament of the additional construction material is at least partially molten, or both.

5. The process as claimed in claim 1, wherein at least one of the construction materials used is a thermoplastic polyurethane elastomer.

6. The process as claimed in claim 1, wherein at least one of the construction materials used comprises a thermoplastic polyurethane elastomer obtainable from the reaction of a polyisocyanate component and a polyol component, wherein the polyol component comprises a polyester polyol having a no-flow point based on ASTM D5985 of 25° C. to 100° C.

7. The process as claimed in claim 1, wherein at least one of the construction materials used comprises a thermoplastic polyurethane polymer that has been obtained from the reaction of a diphenylmethane diisocyanate, an NCO-terminated reaction product thereof with a polyol-containing NCO component, or both and a butane-1,4-diol-containing polyol component.

8. The process as claimed in claim 1, wherein at least one of the construction materials used comprises a thermoplastic polyurethane polymer that has been obtained from the reaction of a hexamethylene 1,6-diisocyanate-containing NCO component, an NCO-terminated reaction product thereof with a polyol, or both and a butane-1,4-diol-containing polyol component, a hexane-1,6-diol-containing polyol component, or both.

9. The process as claimed in claim 1, wherein the process is conducted in a chamber at a temperature of ≤50° C.

10. The process as claimed in claim 1, wherein at least one of the construction materials used is discharged through a nozzle having a temperature of ≤250° C.

11. An article obtained by a process as claimed in claim 1, wherein the article comprises a layer of the first construction material and a layer of the additional construction material, wherein the first construction material comprises the first thermoplastic polyurethane polymer, the additional construction material contains the another thermoplastic polyurethane polymer different than the first thermoplastic polyurethane polymer, and where the article has interlayer adhesion based on a 180° peel test in a construction direction of the additive manufacturing method used in the production thereof that amounts to ≥60% of the interlayer adhesion of a homogeneous test specimen made of that construction material which has the lower interlayer adhesion.

12. The article as claimed in claim 11, wherein the first construction material and the additional construction material are bonded to one another at least partly by covalent chemical bonds.

13. The article as claimed in claim 11, wherein the article has a gradient spatial change in the construction direction in at least one mechanical property that proceeds between a first end of the article and an opposite end of the article.

\* \* \* \* \*

UNITED STATES PATENT AND TRADEMARK OFFICE
CERTIFICATE OF CORRECTION

PATENT NO. : 11,458,671 B2
APPLICATION NO. : 16/605988
DATED : October 4, 2022
INVENTOR(S) : Dirk Achten et al.

It is certified that error appears in the above-identified patent and that said Letters Patent is hereby corrected as shown below:

In the Claims

Column 12, Line 36, In Claim 3, please insert --$\geq$-- between the texts "is" and "50".

Column 12, Line 37, In Claim 3, please insert --$\leq$-- between the texts "to" and "700".

Column 12, Line 50, In Claim 6, please insert --$\geq$-- between the texts "of" and "25° C".

Column 12, Line 50, In Claim 6, please insert --$\leq$--between the texts "to" and "100° C".

Signed and Sealed this
Fourteenth Day of February, 2023

Katherine Kelly Vidal
*Director of the United States Patent and Trademark Office*